(12) United States Patent
Jouanneau et al.

(10) Patent No.: US 9,844,832 B2
(45) Date of Patent: Dec. 19, 2017

(54) LASER NOZZLE HAVING AN INTERNAL MOBILE ELEMENT AND AN EXTERNAL COVER

(71) Applicant: L'Air Liquide, Société Anonyme pour l'Etude et l'Exploitation des Procédés Georges Claude, Paris (FR)

(72) Inventors: Thomas Jouanneau, Grenoble (FR); Philippe Lefebvre, Meulan (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 399 days.

(21) Appl. No.: 14/441,755

(22) PCT Filed: Oct. 23, 2013

(86) PCT No.: PCT/FR2013/052535
§ 371 (c)(1),
(2) Date: May 8, 2015

(87) PCT Pub. No.: WO2014/072611
PCT Pub. Date: May 15, 2014

(65) Prior Publication Data
US 2017/0182589 A1  Jun. 29, 2017

(30) Foreign Application Priority Data

Nov. 9, 2012  (FR) ..................................... 12 60674

(51) Int. Cl.
*B23K 26/04* (2014.01)
*B23K 26/14* (2014.01)
(Continued)

(52) U.S. Cl.
CPC .............. *B23K 26/04* (2013.01); *B23K 26/14* (2013.01); *B23K 26/38* (2013.01); *B23K 26/123* (2013.01); *B23K 26/1476* (2013.01)

(58) Field of Classification Search
CPC ......... B23K 26/04; B23K 26/14; B23K 26/38
(Continued)

(56) References Cited

U.S. PATENT DOCUMENTS 3,519,334 A * 7/1970 Heitmann ............ G02B 21/241
  219/121.75
3,622,743 A * 11/1971 Muncheryan ...... B23K 26/0096
  219/121.62

(Continued)

FOREIGN PATENT DOCUMENTS

AT  391 436  10/1990
DE  198 53 735  3/2000
(Continued)

OTHER PUBLICATIONS

French Search Report and Written Opinion for corresponding FR 1260674, dated Jul. 10, 2013.
(Continued)

*Primary Examiner* — Samuel M Heinrich
(74) *Attorney, Agent, or Firm* — Elwood L. Haynes

(57) ABSTRACT

A laser nozzle comprising a nozzle body (1) comprising a first axial housing (5) comprising a first outlet orifice (11) located in a front face (1*a*) of the nozzle body (1); a movable element (2) arranged in the first axial housing (5) of the nozzle body (1), comprising a front portion (2*a*) forming a skirt and an axial passage (4) having a second outlet orifice (12) emerging from said front portion (2*a*) forming a skirt; and an elastic element (8) arranged in the first axial housing (5), between the nozzle body (1) and the movable element (2). According to the invention, the movable element (2) is
(Continued)

able to move translationally in the first axial housing (5) in the direction of the first outlet orifice (11) under the effect of a gaseous pressure exerted on the movable element (2), and the elastic element (8) exerts an elastic return force on the movable element (2) tending to oppose the translational movement in the first axial housing (5) in the direction of the first outlet orifice (11). Furthermore, the nozzle furthermore comprises an external cover (13) forming a sleeve around all or some of the nozzle body (1). Focusing head and associated laser cutting apparatus. Laser beam cutting process employing a nozzle according to the invention, a laser focusing head according to the invention or an apparatus according to the invention.

10 Claims, 4 Drawing Sheets

(51) Int. Cl.
*B23K 26/38* (2014.01)
*B23K 26/12* (2014.01)

(58) Field of Classification Search
USPC .................................. 219/121.67–121.72
See application file for complete search history.

(56) References Cited

U.S. PATENT DOCUMENTS

| | | |
|---|---|---|
| 4,031,351 A | 6/1977 | Martin |
| 5,786,561 A | 7/1998 | Zefferer et al. |
| 6,130,405 A | 10/2000 | Loringer |

FOREIGN PATENT DOCUMENTS

| | | |
|---|---|---|
| EP | 1 669 159 | 6/2006 |
| EP | 2 130 636 | 12/2009 |
| FR | 1 154 224 | 4/1958 |
| JP | S61 37393 | 2/1986 |
| JP | S62 6790 | 1/1987 |
| JP | S63 40695 | 2/1988 |
| JP | S63 108992 | 5/1988 |
| JP | H07 251287 | 10/1995 |
| JP | 2003 260582 | 9/2003 |

OTHER PUBLICATIONS

International Search Report and Written Opinion for corresponding PCT/FR2013/052535, dated Jan. 21, 2014.

* cited by examiner

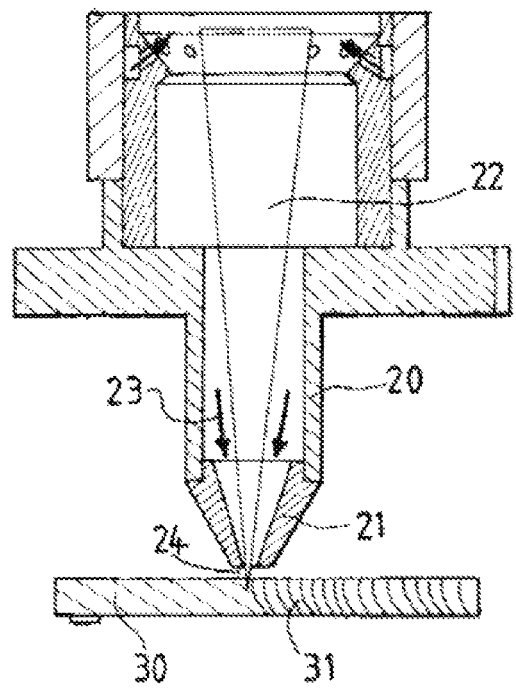
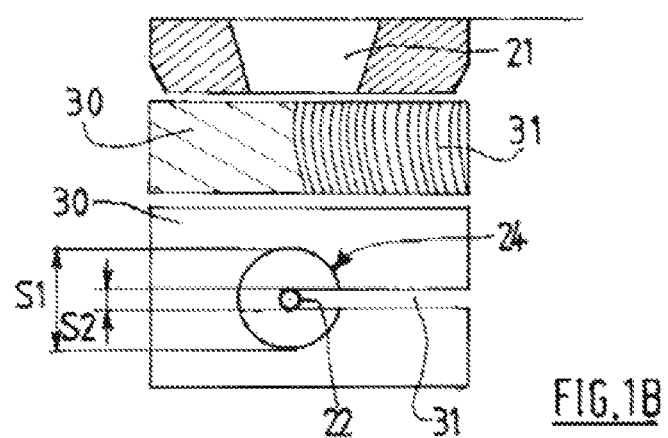
FIG.1A
FIG.1B

LASER NOZZLE HAVING AN INTERNAL MOBILE ELEMENT AND AN EXTERNAL COVER

CROSS REFERENCE TO RELATED APPLICATIONS

This application is a 371 of International PCT Application No. PCT/FR2013/052535 filed Oct. 23, 2013, which claims priority to French Patent Application No. 1260674 filed Nov. 9, 2012, the entire contents of which are incorporated herein by reference.

BACKGROUND

The invention relates to a laser nozzle usable in laser beam cutting, having an internal movable element comprising a skirt that allows the cutting gas to be funneled into the cutting kerf, and furthermore being easier to implement industrially and having a longer lifetime.

Laser beam cutting requires the use of a nozzle, generally made of copper, that channels the gas and allows the laser beam to pass.

These nozzles typically have outlet orifice diameters comprised between 0.5 and 3 mm for a working distance comprised between 0.6 and 2 mm.

In order to enable cutting, it is necessary to use high pressures, in general several bars, in the focusing head in order to allow the gas to penetrate into the kerf to flush out molten metal.

However, a large percentage of the gas used, typically between 50 and 90%, does not take part in the cutting process, i.e. in the expulsion of molten metal, because it is lost to the sides of the cutting kerf.

These gas losses are in fact due to the enormous difference between the flow cross-sectional area of the nozzle orifice and the size of the focal spot. Thus, by way of indication, the flow cross-sectional area of a nozzle with an outlet orifice of diameter equal to 1.5 mm is 25 times larger than the cross-sectional area of the focal spot created by the beam passing through this nozzle.

However, if an insufficient amount of gas penetrates into the kerf, cutting defects will be observed to appear, in particular attached burrs and/or oxidation marks.

Attempting to solve this problem by decreasing the diameter of the orifice of the nozzle is not ideal because the risk is then taken that the laser beam will strike and deteriorate the interior of the nozzle. Decreasing the diameter of the orifice of the nozzle moreover also decreases cutting quality and/or performance.

There are moreover a number of documents proposing various solutions that attempt to encourage gas to penetrate into the kerf, documents EP-A-1669159,JP-A-62006790, JP-A-61037393, JP-A-63108992, JP-A-63040695 and U.S. Pat. No. 4,031,351 for example.

However, none of these solutions is truly ideal because they often have an architecture that is complicated to implement, are bulky relative to conventional nozzles, and/or are of limited effectiveness.

Document U.S. Pat. No. 4,031,351 in particular discloses a laser cutting nozzle comprising a movable element, the end of which is pressed by a spring against the surface of the part to be cut in order to encourage the injection of the cutting gas into the kerf.

The major drawback of this solution resides in the fact that the force exerted by the spring in the direction of the sheet, added to the pressure of the cutting gas, causes the movable element to exert a substantial force on the sheet to be cut. There is therefore a risk that the sheet will be deformed, scratched or even dragged by the movable element, as in general the sheet is simply placed on the table of the industrial cutting machine.

To remedy this drawback, it has been proposed in French patent application No. 1 154 224, filed 16 May 2011, to arrange a movable element in the body of a laser nozzle. This movable element is able to move axially in said body, in the direction of the surface of the sheet to be cut, under the effect of a gaseous pressure. The movable element thus moves toward the upper surface of the sheet to be cut and makes contact therewith, the movable element in this way forming a skirt that concentrates the cutting gas into the kerf, thereby forcing the gas to penetrate into said kerf and improving its effectiveness.

Furthermore, this nozzle comprises an elastic element exerting an elastic return force on the movable element in a direction tending to move it away from the sheet. Thus, when the gas is cut off, the movable element may be returned to its rest position and the skirt therefore retracts into the nozzle body.

However, this solution continues to pose certain problems, especially in the context of industrial use.

Thus, industrial laser cutting machines and the associated laser focusing heads employ, as is known per se, a capacitive distance sensing system to ensure that the focusing head is moved at a constant distance above the sheet to be cut.

These systems use a capacitive effect to detect small variations in distance between two conductive elements forming a capacitor. The distance separating the two conductive elements is determined by measuring the electrical capacitance of this capacitor, which especially depends on the dielectric permittivity of the medium separating them.

A cutting machine is generally equipped with a conventional laser nozzle formed from an electrically conductive material such as copper. When the nozzle is mounted on the end of the head, it is electrically connected to the capacitive sensor system. Thus, the capacitive sensor is able to measure the electrical capacitance between the sheet and the flat end surface of the nozzle, which surface is located facing the sheet.

The capacitive sensor is itself electrically connected to means for controlling the movement of the focusing head so as to adjust the height of the head if the capacitance measured varies or stop the movement of the head if the nozzle and the sheet make contact.

This capacitive sensor system makes it possible to guarantee a cutting performance that is constant in terms of speed and cutting quality, by maintaining the focal point of the laser beam in a constant position relative to the surface of the sheet. It also makes it possible to stop the machine in the case where obstacles are present on the sheet.

It is therefore essential not to disrupt its operation.

However, the use of a laser nozzle having a movable element such as described in French patent application No. 1 154 224 is not easily compatible with such a system.

Specifically, the movable element of the nozzle forms a skirt that makes contact with the sheet to be cut. In order to guarantee that this movable element is able to resist the heat given off by the cutting process and the spatter of molten metal, it may be formed from a metal such as copper, brass or the like.

However, the metal movable element then makes contact both with the sheet, i.e. it is at the same electrical potential as the latter, and with the internal walls of the nozzle body, itself formed from an electrically conductive material. It is therefore necessary to deactivate the capacitive sensor in order to prevent the cutting machine from malfunctioning.

One solution that would permit operation of the capacitive sensor of the machine would be to use a movable element formed from an electrically insulating material. However, this solution is not ideal because electrically insulating materials are in general not very resistant to the intense heat given off by the cutting process and to spatter of molten metal and/or thermal shocks.

The problem to be addressed is therefore how to mitigate all or some of the aforementioned drawbacks, especially by providing a laser nozzle that, relative to existing solutions, has a greatly improved robustness and lifetime and is much easier to implement industrially, and that does not disrupt, or clearly less so than in the prior art, the operation of capacitive distance sensing systems with which industrial cutting machines are equipped.

SUMMARY

The solution of the present invention is thus a laser nozzle comprising:
- a nozzle body comprising a first axial housing comprising a first outlet orifice located in a front face of the nozzle body;
- a movable element arranged in the first axial housing of the nozzle body, comprising a front portion forming a skirt and an axial passage having a second outlet orifice emerging from said front portion forming a skirt, the movable element being able to move translationally in the first axial housing in the direction of the first outlet orifice under the effect of a gaseous pressure exerted on the movable element; and
- an elastic element, arranged in the first axial housing, between the nozzle body and the movable element, said elastic element exerting an elastic return force on the movable element tending to oppose the translational movement in the first axial housing in the direction of the first outlet orifice, characterized in that the nozzle furthermore comprises an external cover forming a sleeve around all or some of the nozzle body.

Depending on the case, the nozzle of the invention may comprise one or more of the following technical features:
- the external cover comprises a first peripheral wall and the nozzle body comprises a second peripheral wall, all or some of said first and second peripheral walls making contact or said first and second peripheral walls being spaced apart from each other.
- the movable element is able to move translationally in the first axial housing in the direction of the first outlet orifice until the front portion protrudes out of said first axial housing through the first outlet orifice.
- the external cover comprises a second axial housing comprising a third outlet orifice located in a front face of said external cover, said third outlet orifice emerging upstream of said second outlet orifice of the axial passage of the movable element when the front portion protrudes out of the first axial housing.
- the nozzle body is formed from an electrically insulating material and the external cover is formed from an electrically conductive material.
- the movable element is able to move between a plurality of positions comprising:
    - a rest position in which the front portion of the movable element is completely or almost completely retracted into the axial housing; and
    - a working position in which the skirt of the front portion of the movable element completely or almost completely protrudes out of the axial housing, through the first outlet orifice.
- at least one sealing element is arranged between the nozzle body and the movable element, for example one or more O-rings.
- said at least one sealing element is arranged in a peripheral groove produced in the external peripheral wall of the movable element.
- the axial passage of the movable element has a conical, frustoconical or convergent/divergent shape.
- the nozzle body is made of an electrically insulating material, in particular an electrically insulating technical ceramic, for example $Al_2O_3$, AlN, $ZrO_2$ or $Al_2TiO_5$, or of a polymer, for example polyetheretherketone (PEEK) or Vespel®, or of an electrically insulating ceramic or Pyrex.
- the external cover is formed from an electrically conductive material, for example a metallic material such as steel, bronze, refractory steel, copper or brass, or an electrically conductive ceramic material.
- all or some of the movable element is formed from an electrically conductive material, for example a metallic material such as steel, bronze, refractory steel, copper or brass, or an electrically conductive ceramic material. Preferably, the movable element is formed from an electrically conductive material that limits friction with the sheet in order to limit wear thereof.
- alternatively, the movable element is made of an electrically insulating material, preferably one that is resistant to high temperatures/heat, in particular an electrically insulating technical ceramic, for example $Al_2O_3$, AlN, $ZrO_2$ or $Al_2TiO_5$, or of a polymer, for example polyetheretherketone (PEEK) or Vespel®, or of an electrically insulating ceramic or Pyrex.

The invention also relates to a laser focusing head comprising at least one focusing optical element, for example one or more lenses or mirrors, especially a focusing lens and a collimating lens, characterized in that it furthermore comprises a laser nozzle according to the invention.

Advantageously, the focusing head according to the invention furthermore comprises a capacitive sensor system, the external cover of the nozzle being electrically connected to said capacitive sensor system.

Moreover, the invention also relates to a laser apparatus comprising a laser generator, a laser focusing head and a laser beam guiding device connected to said laser generator and to said laser focusing head, characterized in that the laser focusing head is according to the invention.

Preferably, the generator or laser source is a $CO_2$, YAG, fiber or disk laser, preferably a fiber or disk laser and especially a ytterbium fiber laser source.

According to yet another aspect, the invention also relates to a laser beam cutting process for cutting a metal part, which process employs a nozzle according to the invention, a laser focusing head according to the invention or an apparatus according to the invention.

Preferably, in the cutting process according to the invention, the distance between the cut metal part and the focusing head is adjusted on the basis of one or more electrical capacitance values measured between the external cover and the metal part.

BRIEF DESCRIPTION OF THE DRAWINGS

The invention will now be better understood by virtue of the following description given with reference to the appended figures, in which:

FIG. 1A schematically shows a focusing head of a conventional laser cutting apparatus;

FIG. 1B schematically shows the size of the laser spot relative to the size of the nozzle orifice;

DESCRIPTION OF PREFERRED EMBODIMENTS

Figure 2A:
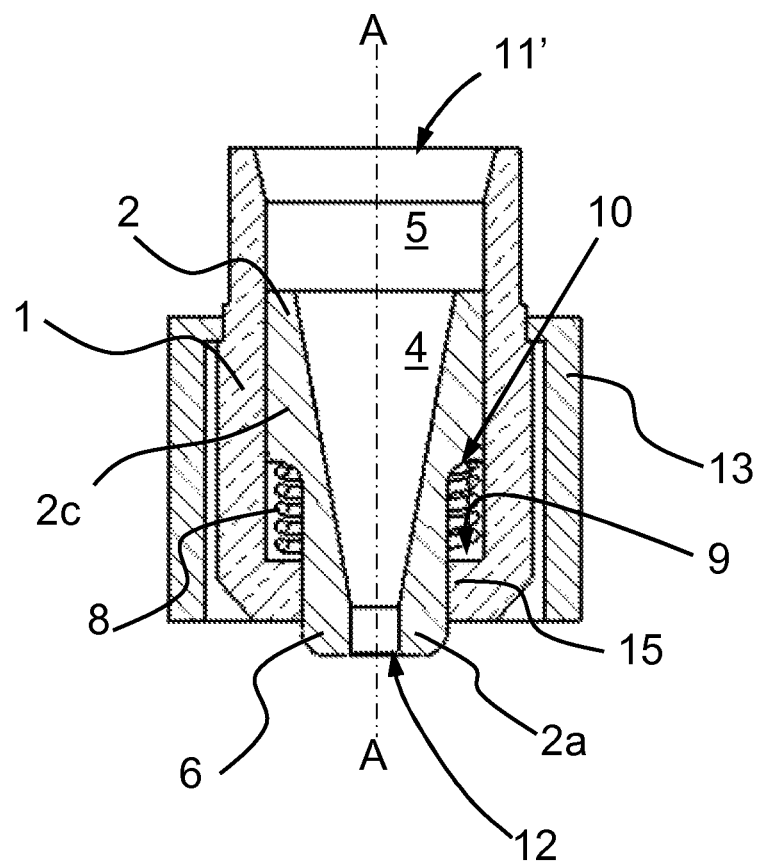
FIG. 2A is a schematic cross-sectional view of the body of a nozzle according to one embodiment of the invention.

FIG. 1A shows the focusing head 20 of a conventional laser cutting apparatus, to which a conventional laser nozzle 21 is fastened, said nozzle being passed through by a focused laser beam and by the assistance gas (arrow 23) that serves to expel metal melted by the beam out of the cutting kerf 31 formed by the beam 22 in the metal part 30 to be cut, for example a sheet of steel or stainless steel.

The assistance gas may be an active gas, such as oxygen, air, $CO_2$ or hydrogen, or an inert gas such as argon, nitrogen or helium, or a mixture of a number of these active and/or inert gases. The composition of the gas is especially chosen depending on the nature of the part to be cut.

The beam, which is made to impact the part, will melt, at this point of impact, the metal, which will be expelled under the part by the pressure of the assistance gas.

FIG. 1B clearly shows the flow cross-sectional area S1 of the orifice 24 of the nozzle 21 relative to the size S2 of the focal spot of the beam 22. As may be seen, the area S1 is very much larger than the size S2 of the focal spot of the beam 22, leading, in conventional nozzles, to a high consumption of assistance gas, only a small proportion of which will serve to expel molten metal from the cutting kerf 31.

In order to considerably decrease gas consumption and the pressure required during cutting, French patent application No 1 154 224 provides a laser nozzle able and designed for cutting with a laser beam with a lower gas flow and/or gas pressure, its particular nozzle architecture forcing a larger proportion of the gas to penetrate into the kerf 31 and to expel effectively molten metal therefrom, whatever the laser power used and the wavelength of the beam.

According to document FR 1 154 224, the laser nozzle comprises a nozzle body 1 interacting with a movable element 2 arranged movably inside the body 1 of the nozzle. The nozzle body 1 is advantageously formed from a conductive material, preferably copper, and the movable element 2 may either be electrically insulating, or electrically conductive.

It will be noted that in the context of the present invention, the expression "electrically insulating material" or "dielectric material" is understood to mean a material that does not conduct electricity, i.e. a material that prevents the passage of electrical current between two electrically conductive elements. In contrast, an electrically conductive material contains many electrical charge carriers that are able to move easily under the action of an electromagnetic field.

However, none of these solutions is ideal, for the aforementioned reasons. On the one hand, electrically insulating materials, such as plastics or analogous materials, are not appropriate because they are not very resistant to the high temperatures, typically from 1000 to 2000° C., encountered in the vicinity of the cutting kerf and/or too abrasive as regards the surface of the sheet. On the other hand, using an electrically conductive material would require the capacitive sensor to be deactivated, thereby decreasing the reliability and performance of the cutting process.

To remedy this, the present invention provides an improved laser nozzle so as to allow a capacitive sensor to detect the surface of the sheet be cut, and to adjust the position of the fixing head relative to said surface.

As may be seen in FIG. 2A, the nozzle of the invention differs in that it comprises three essential components, namely a nozzle body 1, a movable element 2 and an external cover 13 forming a sleeve around all or some of the nozzle body 1.

Advantageously, the nozzle body 1, of first peripheral wall 1c, is an axisymmetric part through which a first axial housing 5 of the axis AA passes from side to side, said housing 5 extending from the back face 1b of the body 1 as far as the front face 1a of said body 1. The first axial housing 5 emerges from the two, front and back, faces respectively 1a and 1b of the nozzle body 1. The back face 1b therefore contains a first inlet orifice 11', whereas the front face 1a contains a first outlet orifice 11 of the nozzle body 1, the first inlet and outlet orifices 11', 11 being coaxial and of axis AA.

This first axial housing 5 is in fact a void, for example of cylindrical shape, comprising a first internal shoulder 9 projecting radially toward the center of the first housing 5, said first internal shoulder 9 being formed by a narrowing of the cross section of the axial housing 5 level with the first outlet orifice 11 in the front face 1a of the nozzle body 1. Preferably, the first internal shoulder 9 is produced in the bottom 15 of said axial housing 5.

Figure 2B:
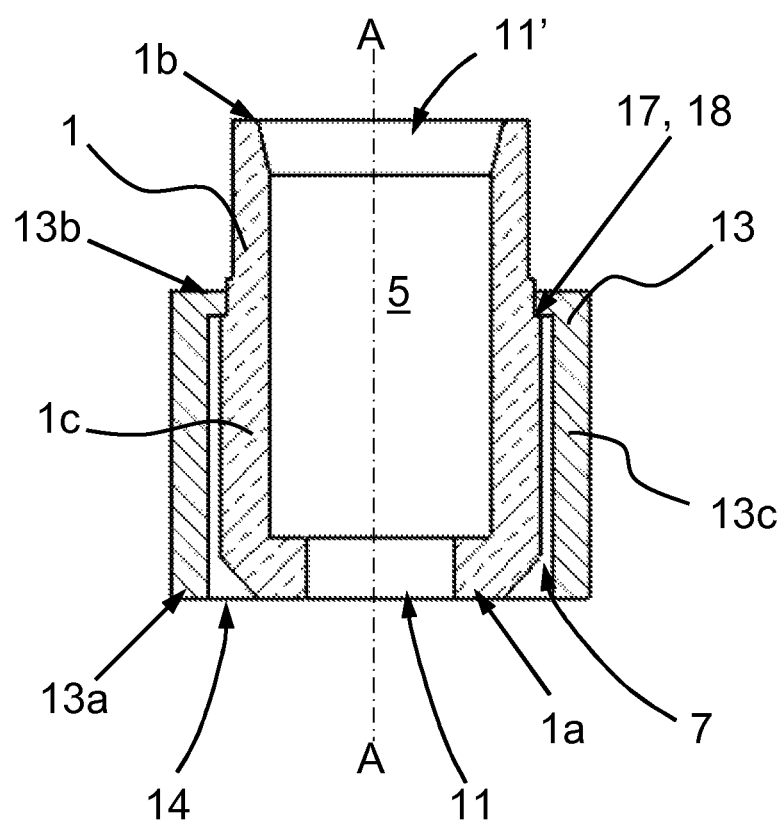
FIG. 2B is a schematic cross-sectional view of a nozzle according to one embodiment of the invention without a movable element arranged therein.

The nozzle moreover comprises a movable element 2 that is inserted into the first housing 5 of the nozzle body 1, preferably coaxially to the body 1, as shown in FIG. 2. This movable element 2 is able and designed to move translationally along the axis AA inside the first housing 5 of the nozzle body 1 in the direction of the first outlet orifice 11.

The peripheral wall 2c of the movable element 2 advantageously comprises a first abutment 10 arranged on the external surface facing said shoulder 9. Preferably, the first abutment 10 is annular in shape and extends over all or some of the periphery of the movable element 2.

This movable element 2 comprises a front portion 2a forming a skirt 6 that is cylindrical in shape, i.e. tubular, arranged in the first axial housing 5 of the nozzle body 1 and comprising an axial passage 4 with a second outlet orifice 12 that emerges from the front portion 2a forming said skirt 6.

The axial passage 4 may have a conical internal profile, its output channel possibly being cylindrical, frustoconical or convergent/divergent (i.e. a de Laval tube) or any other suitable geometry. Preferably, the diameter of the second outlet orifice 12 is comprised between 0.5 and 5 mm.

During use of the nozzle, the laser beam 22 and the assistance gas 23 pass through the axial passage 4 of the movable element 2 and exit via the second outlet orifice 12, which is located in the front portion 2a forming said skirt 6.

The movable element 2 is movable axially relative to the body 1 of the nozzle along the axis AA. In fact, the movable element 2 moves under the effect of the pressure of the assistance gas 23, which is exerted on said movable element 2, thereby tending to push it in the direction of the part 30 to be cut. Advantageously, the movable element 2 is able to move translationally until the front portion 2a protrudes out of the first housing 5, through the first outlet orifice 11.

Figure 4A:
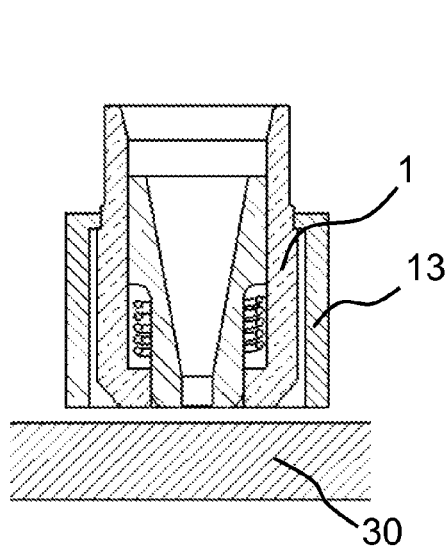
FIGS. 4A and 4B show the nozzle of the invention with the movable element in two different positions.
Figure 4B:
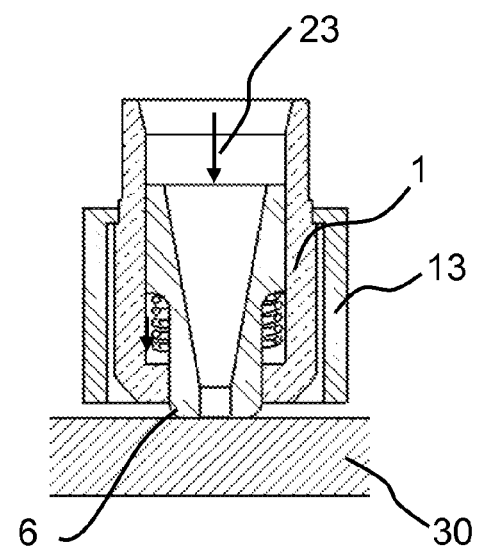

The translational movement along the axis AA of the movable element 2 will cause the skirt 6 to move closer to the upper surface 30 of the sheet to be cut, which will make contact with each other, as illustrated in FIG. 4B.

Thus, the gas will be channeled by the skirt 6 and concentrated on the laser spot and therefore the kerf, thereby greatly improving its effectiveness and the expulsion of metal.

According to the invention, an external cover 13 is arranged around all or some of the nozzle body 1. In fact, the external cover 13 comprises a second axial housing 7 in which the nozzle body 1 is at least partially arranged.

Advantageously, the second peripheral wall 13c and the second axial housing 7 of the external cover 13 are generally cylindrical in shape. The second axial housing 7 comprises a second internal shoulder 17, preferably produced in the upstream end of the cover 13.

In the context of the invention, the terms "upstream" and "downstream" are defined relative to the direction of flow of the cutting gas in the laser nozzle, i.e. from the inlet orifice 11' of the movable element 2 in the direction of the outlet orifice 11 of said movable element 2.

The external peripheral wall 1c of the nozzle body 1 comprises a second abutment 18 arranged facing said second internal shoulder 17, said second abutment 18 allowing the external cover 13 to be maintained around the nozzle body 1.

All or some of said first and second peripheral walls 1c and 13c of the external cover 13 and of the nozzle body 1 may make contact or said first and second peripheral walls 1c and 13c may be spaced apart from each other. In FIG. 2, a space is provided between the first and second walls 1c and 13c. Typically, a distance of about a few mm separates said first and second peripheral walls 1c and 13c.

Advantageously, the external cover 13 comprises a second axial housing 7 comprising a third outlet orifice 14 located in a front face 13a of said external cover 13. The external cover 13 furthermore comprises a back face 13b located on that side opposite the front face 13a of the cover 13.

Figure 3:
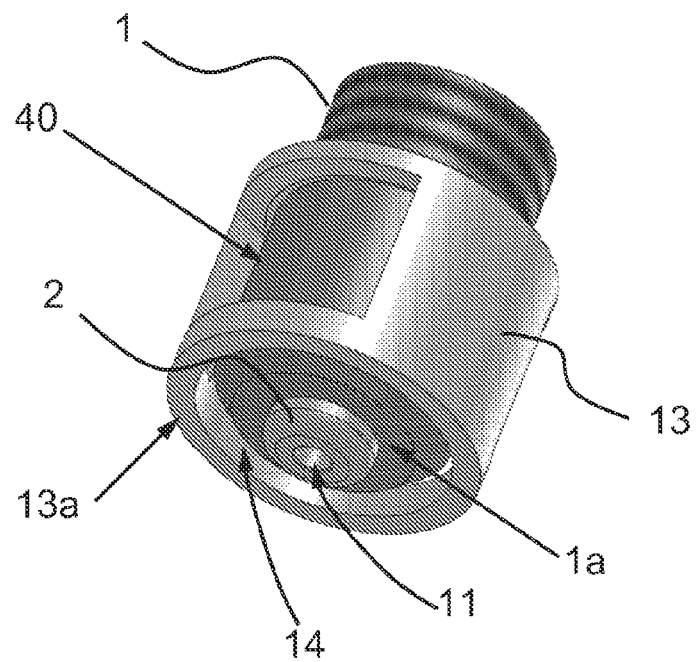
FIG. 3 is a three-dimensional view of a nozzle according to one embodiment of the invention.

Preferably, the second peripheral wall 13c of the external cover 13 extends at least as far as the front face 1a of the nozzle body 1 and around all or some of the periphery of said nozzle body 1. It may be unapertured or comprise an aperture portion 40, such as shown in FIG. 3, this being advantageous when it is desired to decrease the weight of the external cover 13.

Advantageously, said third outlet orifice 14 of the cover 13 may emerge from upstream or downstream of the front face 1a of the nozzle body 1.

Preferably, the cover 13 is designed so that said third outlet orifice 14 emerges upstream of said second outlet orifice 12 of the axial passage 4 of the movable element 2 when the front portion 2a protrudes out of the first axial housing 5.

The nozzle body 1, the external cover 13 and the movable element 2 are preferably axisymmetric parts arranged coaxially to one another, preferably of unitary construction.

The nozzle body 1 is intended to be fastened to the laser focusing head 20 of the laser apparatus. It is formed from an electrically conductive material in conventional nozzles. However, according to the invention, it is preferably formed from an electrically insulating material, possibly a composite, such as a technical ceramic; a polymer, polyetheretherketone (Peek) for example; Vespel®; or Pyrex.

The movable element 2 may be formed from an electrically insulating or conductive material. However, the movable element 2 is preferably formed from an electrically conductive material. This type of material is more resistant to high temperatures and mechanical and/or thermal shocks. This electrically conductive material may be a metallic material, for example steel, bronze, refractory steel, copper or brass, or an electrically conductive ceramic material. Preferably, the movable element is formed from an electrically conductive material that limits friction with the sheet in order to limit wear thereof, i.e. from a material that is not or not very abrasive.

The external cover 13 is advantageously formed from an electrically conductive material, for example a metallic material such as steel, bronze, refractory steel, copper or brass, or an electrically conductive ceramic material.

It will thus be understood that the nozzle of the invention has the advantage of being compatible with capacitive sensor systems, while comprising a movable element formed from an electrically conductive material, this element being more suitable for and more resistant to being positioned in the vicinity of a laser cutting kerf, which was not possible with nozzles having a movable element according to the prior art.

Specifically, in operation, the nozzle body 1 is mounted on the end of a focusing head that is located facing the sheet to be cut. Advantageously, this focusing head comprises, as is known per se, a capacitive sensor system. Typically, the nozzle body 1 comprises means for fitting said body 1 to the focusing head 20, for example a thread such as illustrated in FIG. 3.

Advantageously, once the laser nozzle according to the invention has been fitted on the focusing head, the external cover 13 is designed so that at least one portion of the external surface of said cover, preferably at least one portion of the back face 13b, is electrically connected to the capacitive sensor system with which the head is equipped. Advantageously, this electrical connection is formed by bringing the at least one surface portion of the external cover 13 into contact with one part of the head, said part being formed from an electrically conductive material forming a portion of the capacitive sensor system.

The electrically conductive movable element 2 makes contact with the sheet and therefore has the same electrical potential as the latter. This does not disrupt the capacitive sensor since the nozzle body 1, making contact with the movable element 2, is made of an electrically insulating material.

The capacitive sensor remains operational and measures one or more values of the electrical capacitance between the external cover 13, preferably the front face 13a of the cover 13, and the upper surface of the part to be cut. On the basis of these values, the sensor makes it possible to adjust the distance between the cover and the sheet to a constant or almost constant value, typically between 0.1 and 5 mm and preferably between 0.5 and 2 mm, and to correct for defects in sheet planarity. The sensor also makes it possible to prevent collision with any parts, cut beforehand, that have remained stuck in the skeleton, the sensor triggering recoil of the focusing head or stoppage of the cutting machine.

Thus, the front face 13a of the external cover 13 made of an electrically conductive material, and the focusing head, may be maintained at a height that is kept constant by the capacitive sensor, as is the case with a standard nozzle made of copper without an internal movable element. Furthermore, whether the movable element 2 makes or does not make contact with the sheet, the electrical capacitance values measured between the external cover 13 and the sheet remain unchanged. The replacement of a conventional laser nozzle with a nozzle according to the invention in an industrial laser cutting apparatus is therefore completely transparent with respect to the capacitive sensor equipping the focusing head and the existing laser cutting apparatus.

According to the invention, an elastic element 8, such as a spring, is arranged in the first axial housing 5, between the nozzle body 1 and the movable element 2, so as to exert an elastic return force on the movable element 2 in a direction tending to distance it from the part to be cut. Thus, at the end of the cutting, when the gas is cut off and the gaseous pressure ceases to be exerted on the movable element 2, the latter may be returned to its rest position and therefore the skirt 6 retracts into the first housing 5. The elastic element 8 is advantageously arranged between the first abutment 10 and the first shoulder 9.

The elastic element 8 thus allows effects causing wear of the skirt 6 to be limited during phases of piercing of the sheet, which generally precede the cutting phases. Specifically, this piercing is most often carried out under low gas pressures, typically lower than 4 bar. The elastic element then exerts enough of a return force for the skirt 6 to retract completely or almost completely into the first housing 5, and it is thus protected from molten-metal spatter generated by the piercing.

Furthermore, the elastic element 8 makes it easier to rapidly move the cutting head small distances over the sheet, without the cutting gas or beam, since the gaseous pressure then ceases to be exerted on the movable element and the skirt 6 retracts into the first housing 5. Only the skirt 6 is withdrawn and it is not necessary to raise the focusing head supporting the nozzle.

In addition, the elastic element 8 makes it possible to limit the pressure exerted by the movable element 2 on the part to be cut when said element is moved in the direction of the part under the effect of the cutting gas. More precisely, the return force of the elastic element 8 is advantageously dimensioned so as to maintain the movable element 2 in contact with the part to be cut while limiting the pressure that said element exerts on the sheet, in order to minimize largely, or even eliminate, any risk of deforming the sheet in which the part is cut, of scratching the surface of the sheet, and of dragging the sheet.

Depending on the circumstances, the movable element 2 may comprise a front portion 2*a* of cylindrical shape, i.e. of constant outside diameter along the axis AA, or an end portion shaped to pass over a step or an obstacle without or with a greatly decreased shock on the skirt 6.

Advantageously, the front portion 2*a* comprises an end portion, the outside diameter of which gradually decreases in the direction of the second outlet orifice 12. Thus, the front portion 2*a* is shaped so as to facilitate its passage over reliefs or obstacles present on the surface of the sheet. Shocks are better absorbed because the gradual decrease in the outside diameter of the end portion promotes the retraction of the skirt 6 toward the housing 5 when the skirt 6 encounters a step or a discrete object.

The expression "end portion" is understood to mean a segment of the front portion 2*a* located at the end of said front portion, i.e. facing the upper surface of the sheet to be cut.

In another embodiment of the invention, the end portion comprises at least one chamfer making an angle a to the front face 1*a* of the nozzle body 1. The angle α of the chamfer is comprised between 0.1 and 80° and preferably between 10 and 45°.

In another embodiment, illustrated in FIG. 2A, the external profile of the end portion comprises at least one portion of curvilinear shape. Preferably, the external profile of the end portion comprises at least one portion of convex shape. The radius of curvature of the at least one convex portion is typically comprised between 0.1 and 2 mm.

Optionally, at least one sealing element, an elastomer seal for example, is arranged between the nozzle body 1 and the movable element 2, in particular one or more O-rings, thereby making it possible to create a seal between the nozzle body 1 and the movable insert 2. Preferably, said at least one sealing element is arranged in a peripheral groove produced in the external peripheral wall of the movable element 2.

As may be seen in FIG. 2A, the nozzle of the invention is of standard bulk, i.e. its bulk is no larger than that of a conventional cutting nozzle, which is advantageous and compatible with imbricated cutting, i.e. of parts in a given sheet with very little space separating the various parts.

In fact, the movable element 2 of the nozzle according to the invention is therefore able to move between a plurality of positions, comprising at least:
- a rest position in which the skirt 6 of the front portion 2*a* is completely or almost completely retracted into the axial housing 5 of the nozzle body 1, as illustrated in FIG. 4A; and
- a working position in which the skirt 6 of the front portion 2*a* completely or almost completely protrudes out of the first axial housing 5 of the nozzle body 1, through the first outlet orifice 11, and makes contact with the part 30 to be cut, as illustrated in FIG. 4B.

Of course, the movable element 2 may occupy intermediate positions in which the skirt 6 only partially protrudes out of the first axial housing 5 of the nozzle body 1. These intermediate positions may especially depend on the pressure exerted by the gas on the movable element 2.

The solution of the present invention thus leads to a nozzle having a movable element, which nozzle is more robust, has a longer lifetime and is easier to implement from the industrial point of view than a nozzle according to FR 1 154 224.

EXAMPLES

In order to demonstrate the effectiveness of the nozzle according to the invention relative to a standard nozzle, i.e. a conventional nozzle without a movable element, and therefore the advantage of using a skirt mounted on a movable element to force gas into the cutting kerf, comparative trials were carried out using a cutting apparatus employing a $CO_2$ laser generator to generate a laser beam that was directed to a laser focusing head comprising focusing optical elements, namely lenses.

The laser focusing head was equipped either with a standard nozzle having an outlet orifice of 1.8 mm, or with a nozzle according to FIG. 2 having a cylindrical movable skirt made of steel and a body made of a technical ceramic, the axial passage having a conical profile and a cylindrical outlet channel of 1.8 mm in diameter. Furthermore, the nozzle comprised an external cover made of copper. During this trial, the capacitive sensor was parametered in order to adjust the distance between the front face of the cover and the upper surface of the sheet to be cut to a distance of 1 mm.

The assistance gas used was nitrogen.

The sheet to be cut was a 5 mm-thick sheet of 304L stainless steel.

The laser beam had a power of 4 kW and the cutting speed was 2.6 m/min.

The results obtained demonstrated that:
- with the standard nozzle, a gas pressure of 14 bars is not enough to obtain a quality cut. Specifically, at 14 bars, the edges of the cut contain many attached burrs. This demonstrates that the evacuation of the molten metal has not taken place as it should because of an insufficient action of the gas on the molten metal needing to be expelled. In order to remove these burrs, a pressure of 16 bars was required.

with the nozzle of the invention, trials carried out at pressures ranging between 1 and 5 bars led to good-quality cuts, i.e. having cut edges devoid of attached burrs. The skirt of the nozzle allowed gas to be channeled into the kerf and the molten metal to be effectively expelled. Furthermore, the nozzle allowed the capacitive sensor to operate and kept the head at a constant height relative to the upper surface of the sheet cut.

These trials clearly demonstrate the effectiveness of a nozzle according to the invention, which allows the gas pressures implemented to be considerably decreased relative to a standard nozzle, under otherwise identical conditions, and therefore gas consumption to also be decreased. Furthermore, operation of the existent laser cutting apparatus was in no way disrupted by use of the nozzle of the invention. It was easy to maintain the focusing head a constant height above the upper surface of the sheet to be cut by measuring values of the electrical capacitance between the external cover of the nozzle and the sheet and by adjusting the heightwise position of the head depending on any variation in said values.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A laser nozzle comprising:
   a nozzle body comprising a first axial housing comprising a first outlet orifice located in a front face of the nozzle body;
   a movable element arranged in the first axial housing of the nozzle body, comprising a front portion forming a skirt and an axial passage having a second outlet orifice emerging from said front portion forming a skirt; and
   an elastic element arranged in the first axial housing, between the nozzle body and the movable element,
   wherein the movable element is able to move translationally in the first axial housing in the direction of the first outlet orifice under the effect of a gaseous pressure exerted on the movable element;
   the elastic element exerts an elastic return force on the movable element tending to oppose the translational movement in the first axial housing in the direction of the first outlet orifice; and
   an external cover forming a sleeve around all or some of the nozzle body.

2. The nozzle of claim 1, wherein the external cover comprises a first peripheral wall and the nozzle body comprises a second peripheral wall, all or some of said first and second peripheral walls making contact or said first and second peripheral walls being spaced apart from each other.

3. The nozzle of claim 1, wherein the movable element is able to move translationally in the first axial housing in the direction of the first outlet orifice until the front portion protrudes out of said first axial housing through the first outlet orifice.

4. The nozzle of claim 1, wherein the external cover comprises a second axial housing comprising a third outlet orifice located in a front face of said external cover, said third outlet orifice emerging upstream of said second outlet orifice of the axial passage of the movable element when the front portion protrudes out of the first axial housing.

5. The nozzle of claim 1, wherein the nozzle body is formed from an electrically insulating material and the external cover is formed from an electrically conductive material.

6. The nozzle of claim 1, wherein the movable element is able to move between a plurality of positions comprising:
   a rest position in which the front portion of the movable element is completely or almost completely retracted into the axial housing; and
   a working position in which the skirt of the front portion of the movable element completely or almost completely protrudes out of the axial housing through the first outlet orifice.

7. A laser focusing head comprising at least one focusing optical element, further comprising a laser nozzle as claimed claim 1.

8. The focusing head as claimed in claim 7, further comprising a capacitive sensor system, the external cover of the nozzle being electrically connected to said capacitive sensor system.

9. A laser apparatus comprising a laser generator, a laser focusing head and a laser beam guiding device connected to said laser generator and to said laser focusing head, wherein the laser focusing head is as claimed in claim 7.

10. The apparatus as claimed in claim 9, wherein the laser generator is a $CO_2$, YAG, fiber or disk laser generator.

* * * * *